(12) United States Patent
Yoshida et al.

(10) Patent No.: US 11,028,924 B2
(45) Date of Patent: Jun. 8, 2021

(54) GASKET AND METHOD FOR MANUFACTURING SAME

(71) Applicant: NOK CORPORATION, Tokyo (JP)

(72) Inventors: Satomi Yoshida, Fujisawa (JP); Hajime Yui, Fujisawa (JP)

(73) Assignee: NOK CORPORATION

( * ) Notice: Subject to any disclaimer, the term of this patent is extended or adjusted under 35 U.S.C. 154(b) by 36 days.

(21) Appl. No.: 16/340,177

(22) PCT Filed: Oct. 12, 2017

(86) PCT No.: PCT/JP2017/036910
§ 371 (c)(1),
(2) Date: Apr. 8, 2019

(87) PCT Pub. No.: WO2018/083956
PCT Pub. Date: May 11, 2018

(65) Prior Publication Data
US 2019/0309850 A1      Oct. 10, 2019

(30) Foreign Application Priority Data

Nov. 7, 2016 (JP) .............................. JP2016-217465
May 23, 2017 (JP) .............................. JP2017-101506

(51) Int. Cl.
*F16J 15/10* (2006.01)
*F16J 15/06* (2006.01)
(Continued)

(52) U.S. Cl.
CPC ........... *F16J 15/10* (2013.01); *B29C 45/1418* (2013.01); *F16J 15/00* (2013.01); *F16J 15/06* (2013.01);
(Continued)

(58) Field of Classification Search
CPC .... F16J 15/00; F16J 15/10; F16J 15/06; F16J 15/061; F16J 15/0831; F16J 15/062; F16J 15/104; H01M 8/0286
(Continued)

(56) References Cited

U.S. PATENT DOCUMENTS

| | | | | |
|---|---|---|---|---|
| 4,830,698 A | * | 5/1989 | DeCore | ..................... B32B 7/02 156/219 |
| 5,340,525 A | * | 8/1994 | Czernik | .................. B29C 43/18 264/266 |

(Continued)

FOREIGN PATENT DOCUMENTS

| | | |
|---|---|---|
| CN | 1605739 A | 4/2005 |
| CN | 204226639 U | 3/2015 |

(Continued)

OTHER PUBLICATIONS

European Office Action for Patent Application No. EP 17868330.6 dated Oct. 13, 2020 (5 pages).
(Continued)

*Primary Examiner* — Nathan Cumar
(74) *Attorney, Agent, or Firm* — Harness, Dickey & Pierce, P.L.C.

(57) ABSTRACT

A two-sided gasket is constituted of gasket bodies respectively provided on both surfaces of a base member in a thickness direction. The gasket has a structure in which one gasket body contributes to ensuring a seal surface pressure in an opposite gasket body, such that a configuration of the opposite gasket body and a method for forming the opposite gasket body are simplified. The gasket includes a base member, one gasket body that is provided on one side surface of the base member in the thickness direction, and an opposite gasket body that is provided on an opposite side surface of the base member in the thickness direction. The one gasket body includes a projection protruding toward the
(Continued)

opposite side in the thickness direction. The base member includes a deformed portion protruding toward the opposite side in the thickness direction by covering the projection. The opposite gasket body is formed as a film-shaped rubber layer deposited on a front surface of the deformed portion.

4 Claims, 11 Drawing Sheets

(51) Int. Cl.
*F16J 15/00* (2006.01)
*B29C 45/14* (2006.01)
*H01M 8/0286* (2016.01)

(52) U.S. Cl.
CPC ......... *F16J 15/104* (2013.01); *H01M 8/0286* (2013.01)

(58) Field of Classification Search
USPC .......................................... 277/590
See application file for complete search history.

(56) References Cited

U.S. PATENT DOCUMENTS 5,511,797 A * 4/1996 Nikirk .................... F16J 15/125
277/609

2005/0127615 A1 * 6/2005 Matsuki ................. F16J 15/122
277/592
2013/0065158 A1 * 3/2013 Masaka ............... H01M 8/0273
429/516
2015/0295210 A1 * 10/2015 Horimoto ........... H01M 8/0273
277/654

FOREIGN PATENT DOCUMENTS

| | | |
|---|---|---|
| CN | 104755818 A | 7/2015 |
| EP | 2581631 A1 | 4/2013 |
| EP | 2719929 A1 | 4/2014 |
| EP | 3534045 A1 | 9/2019 |
| JP | S59-77660 U | 5/1984 |
| JP | H02-021072 A | 1/1990 |
| JP | 06-082468 U | 11/1994 |
| JP | 2000-230640 A | 8/2000 |
| JP | 2005-108565 A | 4/2005 |
| JP | 2005-201350 A | 7/2005 |
| WO | WO-2011-158624 A1 | 12/2011 |
| WO | WO-2016-163158 A1 | 10/2016 |

OTHER PUBLICATIONS

Extended European Search Report for Patent Application No. EP 17868330.6 dated Oct. 23, 2019 (7 pages.).

European Office Action for Patent Application No. EP 17868330.6 dated Mar. 26, 2021 (6 pages).

* cited by examiner

GASKET AND METHOD FOR MANUFACTURING SAME

CROSS REFERENCE TO RELATED APPLICATIONS

This application is a U.S. National Stage application of International Application No. PCT/JP2017/036910 filed on Oct. 12, 2017 and published in Japanese as WO 2018/083956 on May 11, 2018 and claims priority to Japanese Patent Application Nos. 2017-101506 filed on May 23, 2017 and 2016-217465 filed on Nov. 7, 2016. The entire disclosures of the above applications are expressly incorporated by reference herein.

BACKGROUND

Technical Field

The present invention relates to a gasket according to a sealing technology and a method for manufacturing the same. More specifically, the present invention relates to a gasket that includes a base member and gasket bodies deposited on the base member, and a method for manufacturing the same. For example, the gasket of the present invention is used as a fuel battery gasket or a general gasket for other purposes.

Related Art

In the related art, as gaskets used in fuel battery cells or the like, rubber-only-type two-sided gaskets constituted of only an elastic rubbery substance as disclosed in the following Japanese Patent Application Laid-Open No. 2005-108565, or two-sided gaskets 510 realized by integrally molding gasket bodies 520 constituted of an elastic rubbery substance and respectively provided on both surfaces of a base member 530 in a thickness direction as illustrated in FIG. 15 are known.

However, since rubber-only-type two-sided gaskets are constituted of only an elastic rubbery substance, the gaskets are easily deformed, and there is room for amelioration in handling workability (handling ability) during transportation or assembling.

On the other hand, according to the two-sided gasket 510 in FIG. 15, the gasket bodies 520 constituted of an elastic rubbery substance are held by the base member 530 constituted of a resin film or the like. Therefore, it is possible to ameliorate the handling workability (handling ability) during transportation or assembling.

However, in the configuration of the two-sided gasket 510 as illustrated in FIG. 15, the base member 530 maintains a flat plate shape, and the gasket bodies 520 are injection-molded on both surfaces of the base member 530 in the thickness direction. Therefore, it is necessary for each of the molded gasket bodies 520 to uniquely ensure a seal surface pressure. In contrast, in a case of a structure in which one gasket body 520 contributes to ensuring the seal surface pressure in an opposite gasket body 520, it is possible to realize advantages in which the opposite gasket body 520 can be thinned and the opposite gasket body 520 can be formed by a simple method other than injection molding using a mold.

An object of the present invention is to provide a two-sided gasket constituted of gasket bodies respectively provided on both surfaces of a base member in a thickness direction, and a method for manufacturing the same. The gasket has a structure in which one gasket body contributes to ensuring a seal surface pressure in an opposite gasket body, such that a configuration of the opposite gasket body and a method for forming the opposite gasket body can be simplified.

SUMMARY OF THE INVENTION

In order to solve the foregoing problem, the present invention provides a gasket including a base member, one gasket body that is provided on one side surface of the base member in a thickness direction, and an opposite gasket body that is provided on an opposite side surface of the base member in the thickness direction. The one gasket body includes a projection protruding toward the opposite side in the thickness direction. The base member includes a deformed portion protruding toward the opposite side in the thickness direction by covering the projection. The opposite gasket body is formed as a film-shaped rubber layer deposited on a front surface of the deformed portion.

As an aspect of the embodiment, the projection includes a flat portion at a distal end of the projection.

As an aspect of the embodiment, the projection has a reversely tapered structure in which a width of a distal end is larger than a width of a proximal part of the projection.

As an aspect of the embodiment, the projection includes a small projection at a distal end of the projection.

In addition, the present invention provides a method for manufacturing a gasket, that is, a method for manufacturing the foregoing gasket sequentially performing a step of molding the one gasket body with a mold into which the base member is inserted, and simultaneously forming the deformed portion in the base member using a molding material filling pressure, and a step of taking out a molded article constituted of the one gasket body and the base member from the mold, and providing the opposite gasket body on the molded article in a retrofitted manner.

As an aspect of the embodiment, the step of providing the opposite gasket body on the molded article in a retrofitted manner is performed by a screen printing method, a dispenser coating method, a spray coating method, or an ink jet coating method.

As an aspect of the embodiment, the step of providing the opposite gasket body on the molded article in a retrofitted manner is performed by using an ultraviolet curable material or a room-temperature curable material.

In addition, the present invention provides a method for manufacturing a gasket, that is, a method for manufacturing the foregoing gasket sequentially performing a step of providing a material to be made into the opposite gasket body on the opposite side surface of the base member in the thickness direction in a pre-fitted manner, and a step of molding the one gasket body with a mold into which the base member is inserted, and simultaneously forming the deformed portion in the base member using a molding material filling pressure.

As an aspect of the embodiment, the step of providing a material to be made into the opposite gasket body on the opposite side surface of the base member in the thickness direction in a pre-fitted manner is performed by a screen printing method, a dispenser coating method, a spray coating method, or an ink jet coating method.

As an aspect of the embodiment, the step of providing a material to be made into the opposite gasket body on the opposite side surface of the base member in the thickness direction in a pre-fitted manner is performed by using an ultraviolet curable material or a room-temperature curable material.

Effect of the Invention

According to the present invention having the foregoing configuration, it is possible to provide a two-sided gasket constituted of gasket bodies respectively provided on both surfaces of a base member in a thickness direction, and a method for manufacturing the same. The gasket has a structure in which one gasket body contributes to ensuring a seal surface pressure in an opposite gasket body, such that a configuration of the opposite gasket body and a method for forming the opposite gasket body can be simplified.

DETAILED DESCRIPTION OF THE PREFERRED EMBODIMENTS

First Embodiment

Figure 1:
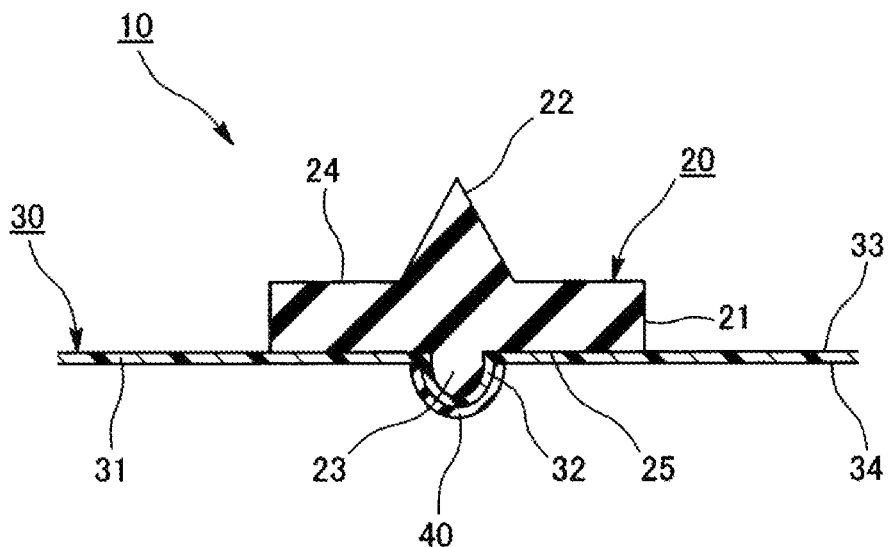
FIG. 1 is a cross-sectional view of a main part of a gasket according to a first embodiment.

As illustrated in FIG. 1, a gasket 10 according to an embodiment is formed as a two-sided gasket integrally including a base member 30, one gasket body 20 that is provided on one side surface (upper surface in the diagram) 33 of this base member 30 in a thickness direction, and an opposite gasket body 40 that is provided on an opposite side surface (lower surface in the diagram) 34 of the base member 30 in the thickness direction. The one gasket body 20 includes a projection 23 protruding toward the opposite side in the thickness direction. The base member 30 includes a deformed portion 32 protruding toward the opposite side in the thickness direction by covering the projection 23. The opposite gasket body 40 is formed as a film-shaped rubber layer which is deposited on a front surface of the deformed portion 32, and a seal surface pressure is applied to the opposite gasket body 40 due to the rubber elasticity of the projection 23.

The one gasket body 20 is constituted of a necessary elastic rubbery substance (rubber material) and includes a gasket base portion 21 having a rectangular cross-sectional shape. A seal lip 22 having a triangular cross-sectional shape is integrally provided in a central portion in a width direction on one side surface (upper surface) 24 of the gasket base portion 21 in the thickness direction, and the projection 23 having an arced cross-sectional shape or a semicircular cross-sectional shape is integrally provided in a central portion in the width direction on the opposite side surface (lower surface) 25 of the gasket base portion 21 in the thickness direction. In the projection 23, the width thereof is set to be smaller than the width of the gasket base portion 21 or the width of the seal lip 22, and the height thereof is set to be larger than the thickness of the base member 30.

The base member 30 is constituted of a necessary resin film and includes a base member body 31 which maintains a flat plate shape even in a state where the gasket is brought to completion. The deformed portion 32 which has a three-dimensionally hollow shape exhibiting an arced cross-sectional shape or a semicircular cross-sectional shape in the same manner as the projection 23 and covers the projection 23 is provided integrally with this base member body 31.

The opposite gasket body 40 is constituted of an elastic rubbery substance (rubber material) of the same kind as or a kind different from the one gasket body 20 and is formed as a film-shaped rubber layer exhibiting an arced cross-sectional shape or a semicircular cross-sectional shape in the same manner as the deformed portion 32 such that a protruding-side front surface portion of the deformed portion 32 is covered.

Figure 2:
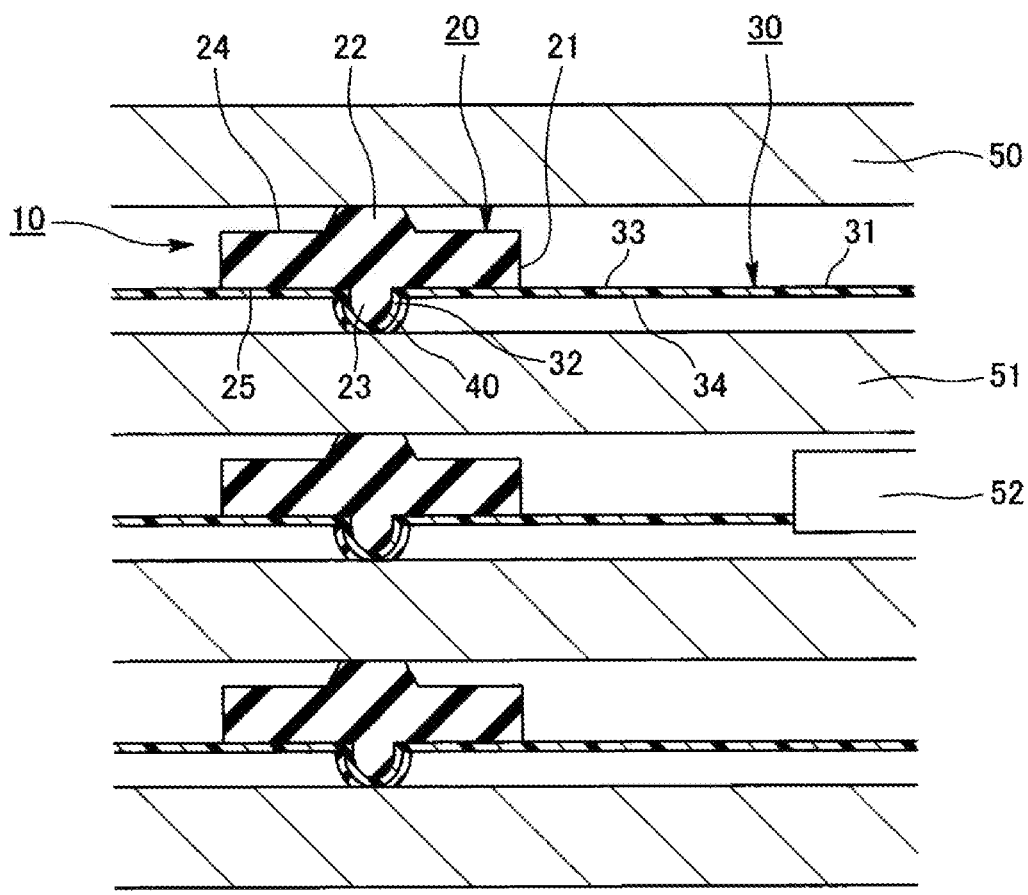
FIG. 2 is a view describing a state where the gasket is mounted.

As illustrated in FIG. 2, the gasket 10 having the foregoing configuration is used as a fuel battery gasket which is mounted between a pair of separators 50 and 51 in a fuel battery cell and exhibits a sealing function. The base member 30 is sometimes coupled to a cell interpolation component 52 constituted of a membrane electrode assembly (MEA), a gas diffusion layer (GDL), or the like. The gasket 10 is mounted between the pair of separators 50 and 51 and is compressed in the thickness direction. The one gasket body 20 generates a seal surface pressure by the fact that the seal lip 22 is pressed to the separator 50 on one side due to a reaction force accompanying the compression, thereby exhibiting the sealing function. The opposite gasket body 40 generates a seal surface pressure by the fact that this opposite gasket body 40 is pressed to the separator 51 on the opposite side due to a reaction force accompanying the compression, thereby exhibiting the sealing function. In addition, since the opposite gasket body 40 is in a state of being supported (backed up) by the projection 23 of the one gasket body 20, a seal surface pressure is applied or added thereto due to the rubber elasticity of the projection 23. Therefore, since it is not necessary for the opposite gasket body 40 to uniquely generate all the seal surface pressure, the opposite gasket body 40 can be formed as a rubber layer having a film shape or a thin film shape.

Next, a method for manufacturing the gasket 10 will be described. A mold (mold for injection molding) 60 is used for manufacturing the gasket 10.

Figure 3:
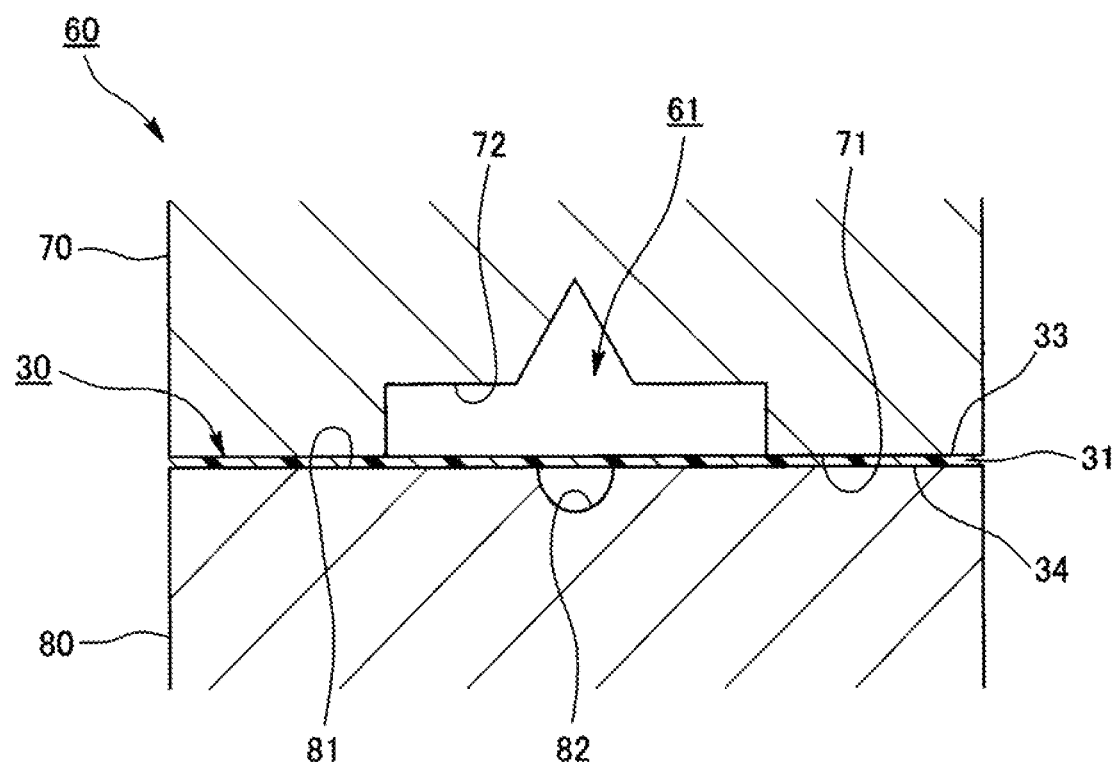
FIG. 3 is a view describing a method for manufacturing the gasket.

As illustrated in FIG. 3, the mold 60 includes an upper mold 70 and a lower mold 80. A cavity 72 for molding the gasket base portion 21 and the seal lip 22 of the one gasket body 20 is provided on a parting surface 71 of the upper mold 70. A cavity 82 for molding the projection 23 of the one gasket body 20 is provided on a parting surface 81 of the lower mold 80.

Figure 4:
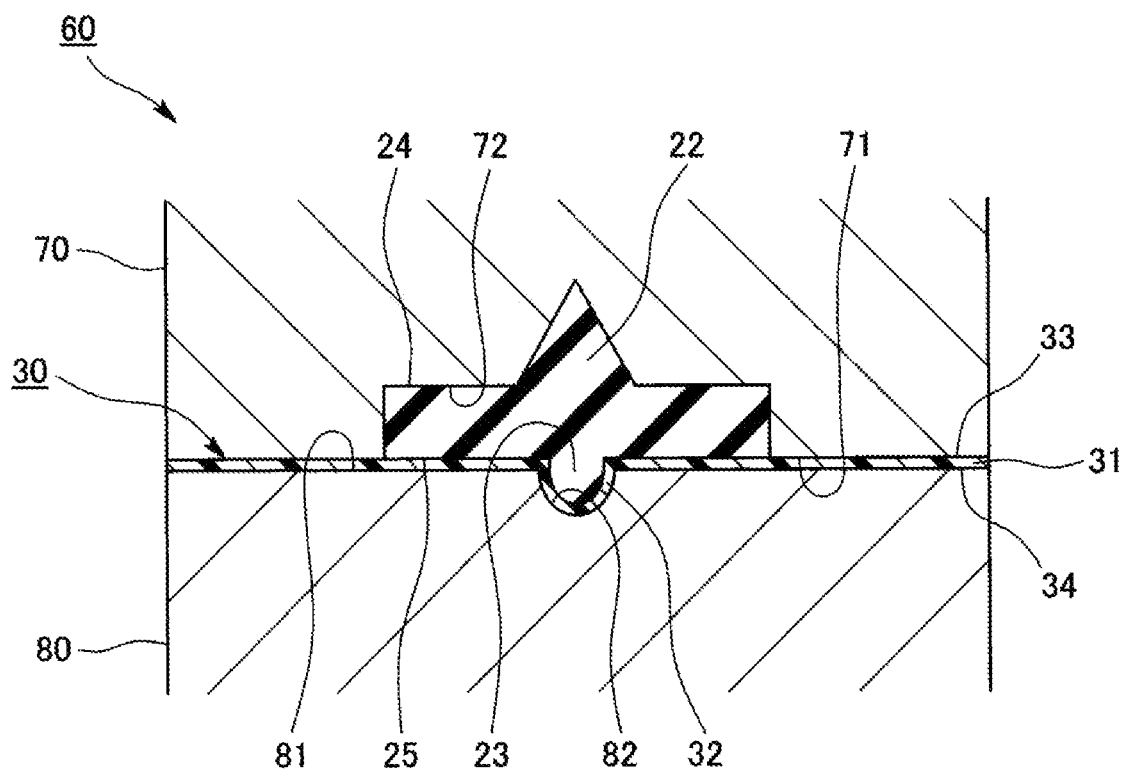
FIG. 4 is a view describing the method for manufacturing the gasket.

As a manufacturing procedure, first, the molds are fastened in a state where the base member 30 is interposed between the upper mold 70 and the lower mold 80. Subsequently, as illustrated in FIG. 4, the cavity 72 of the upper mold 70 is filled with a molding material for molding the one gasket body 20. When the cavity 72 of the upper mold 70 is filled with the molding material, the base member 30 is deformed (plastic deformation) due to a molding material filling pressure (injection pressure) thereof, so that the base member 30 is shaped along an inner surface of the cavity 82 of the lower mold 80. Accordingly, the deformed portion 32 is formed in the base member 30, and the cavity 82 of the lower mold 80 is also filled with a molding material, thereby forming the projection 23.

Figure 5:
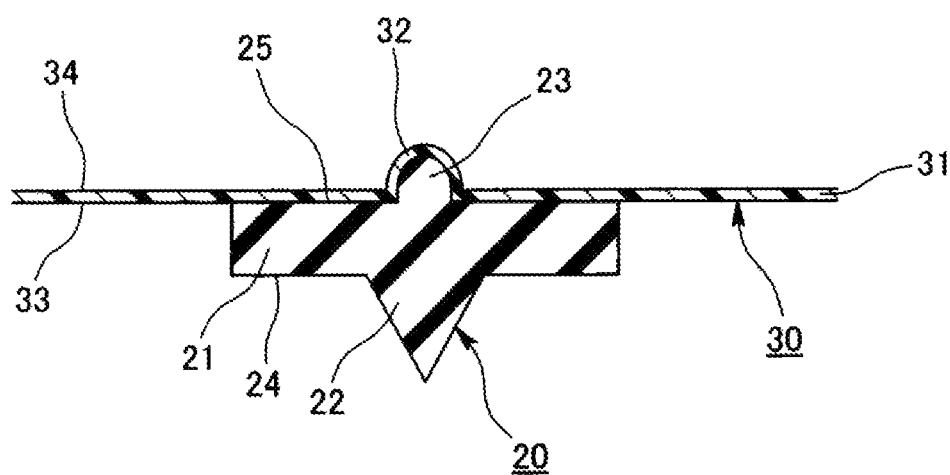
FIG. 5 is a view describing the method for manufacturing the gasket.
Figure 6:
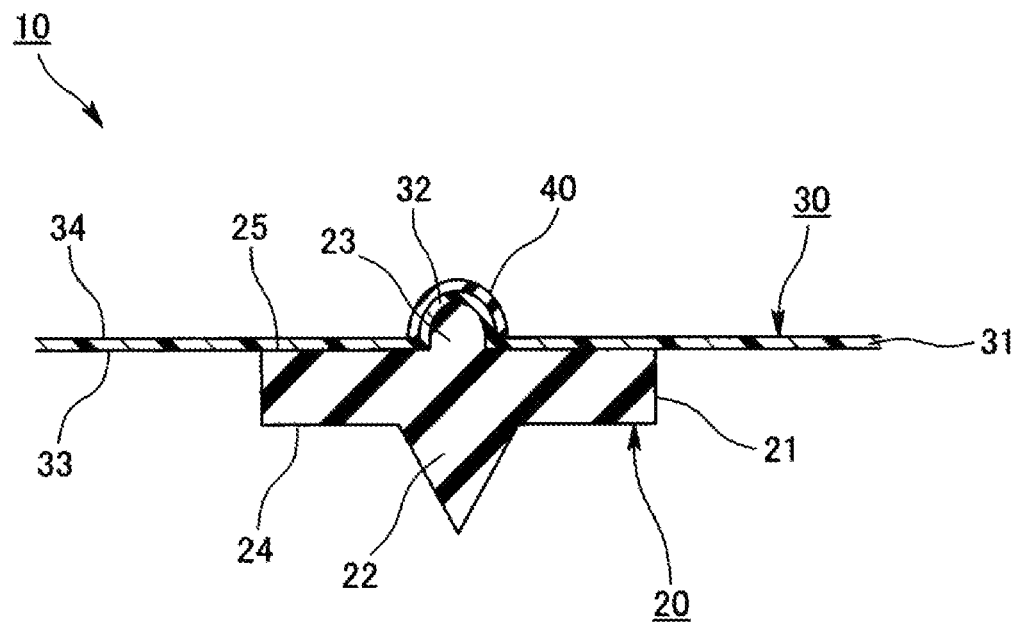
FIG. 6 is a view describing the method for manufacturing the gasket.

Subsequently, after the molding material is cured, as illustrated in FIG. 5 a molded article constituted of a combination of the base member 30 and the one gasket body 20 is taken out from the mold 60. Subsequently, as illustrated in FIG. 6, the opposite gasket body 40 is formed on a protruding-side front surface of the deformed portion 32 in a retrofitted manner. The opposite gasket body 40 is formed by a simple method other than injection molding using a mold, such as a screen printing method, a dispenser coating method, a spray coating method, or an ink jet coating method. Therefore, according to this method, a step of molding the opposite gasket body 40 can be simplified, and the cost can also be reduced.

Figure 7:
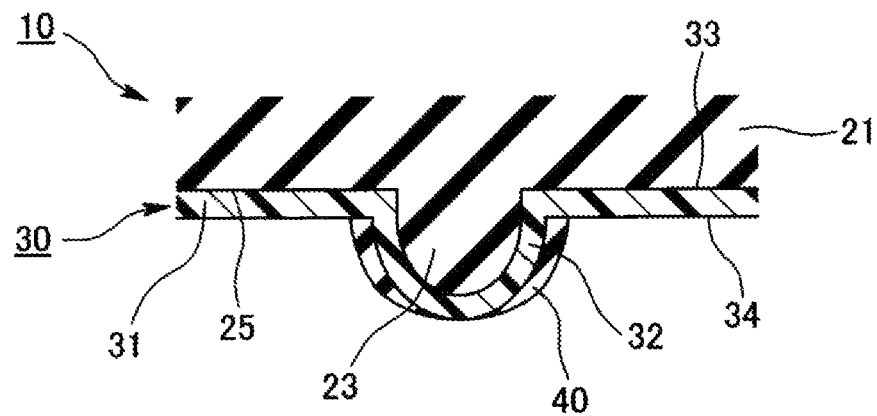
FIG. 7 is a cross-sectional view of a main part illustrating a state where a rubber layer in the gasket is not uniformly molded.

When forming the opposite gasket body 40, it is not preferable, in regard to the sealing function, that the deformed portion 32 constituted of a resin film is exposed as illustrated in FIG. 7 after the opposite gasket body 40 is formed. Therefore, it is desirable to accurately control the coating amount and the coating thickness of the rubber material.

The gasket 10 may adopt the following shapes and configurations.

Second Embodiment

The projection 23 may include a flat portion at its distal end.

Figure 8:
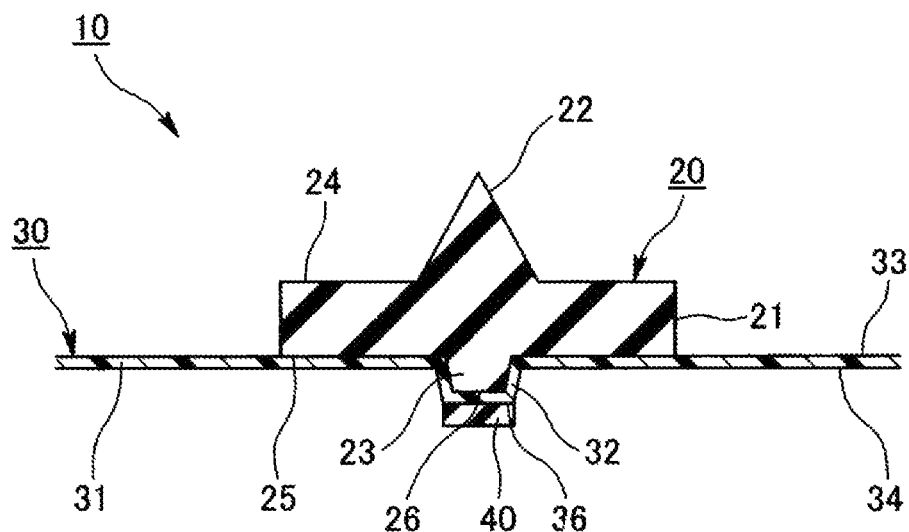
FIG. 8 is a cross-sectional view of a main part of a gasket according to a second embodiment.

In FIG. 8 as an example thereof, a flat portion 26 parallel to the base member 30 is provided in a distal end portion of the projection 23 in a protruding direction, and the projection 23 has a trapezoidal cross-sectional shape. In addition, in a manner following this configuration, a flat portion 36 is also provided in a distal end portion of the deformed portion 32 in the protruding direction, and the opposite gasket body 40 has a flat shape. When the flat portions 26 and 36 are provided and the opposite gasket body 40 has a flat shape in this manner, it is easy to uniformly form the thickness of the opposite gasket body 40 (thickness of the film-shaped rubber layer) across the whole surface. Therefore, it is possible to prevent the deformed portion 32 from being exposed as illustrated in FIG. 7.

Third Embodiment

The projection 23 may have a reversely tapered structure in which the width of a distal end is larger than the width of a proximal part.

Figure 9:
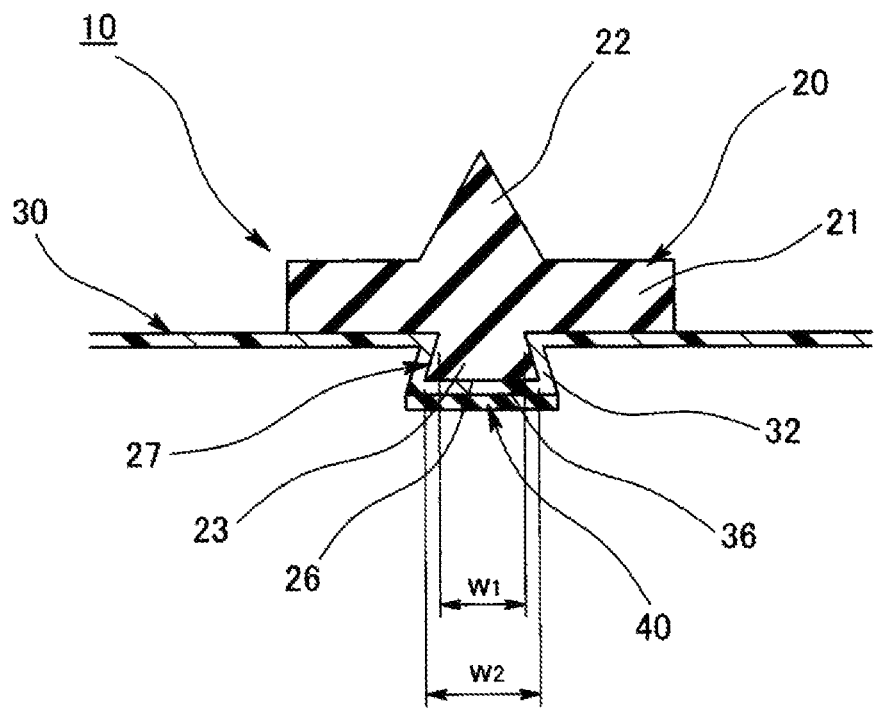
FIG. 9 is a cross-sectional view of a main part of a gasket according to a third embodiment.

In FIG. 9 as an example thereof, a reversely tapered structure 27 in which a width $w_2$ of the distal end is larger than a width $w_1$ of the proximal part is provided in the projection 23. In addition, the flat portion 26 parallel to the base member 30 is provided in the distal end portion of the projection 23 in the protruding direction, and the projection 23 has a reversed trapezoidal cross-sectional shape compared to that in FIG. 8. In addition, in a manner following this configuration, the flat portion 36 is also provided in the distal end portion of the deformed portion 32 in the protruding direction, and the opposite gasket body 40 has a flat shape. When the reversely tapered structure 27 is provided in this manner, the one gasket body 20 is unlikely to be separated from the base member 30. Therefore, handling workability (handling ability) during transportation or assembling can be further improved.

Fourth Embodiment

The projection 23 may include a small projection at its distal end.

Figure 10A:
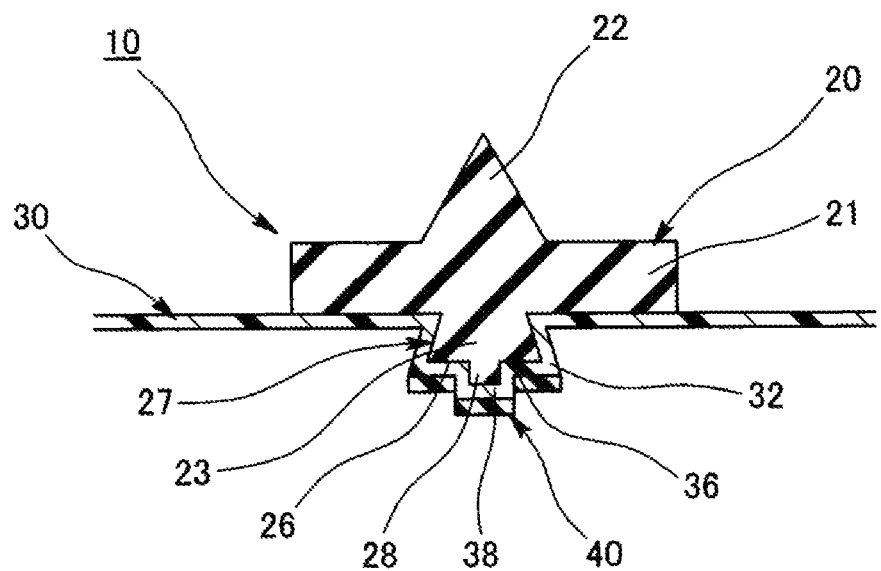
FIGS. 10A and 10B are cross-sectional views of a main part of a gasket according to a fourth embodiment.
Figure 10B:
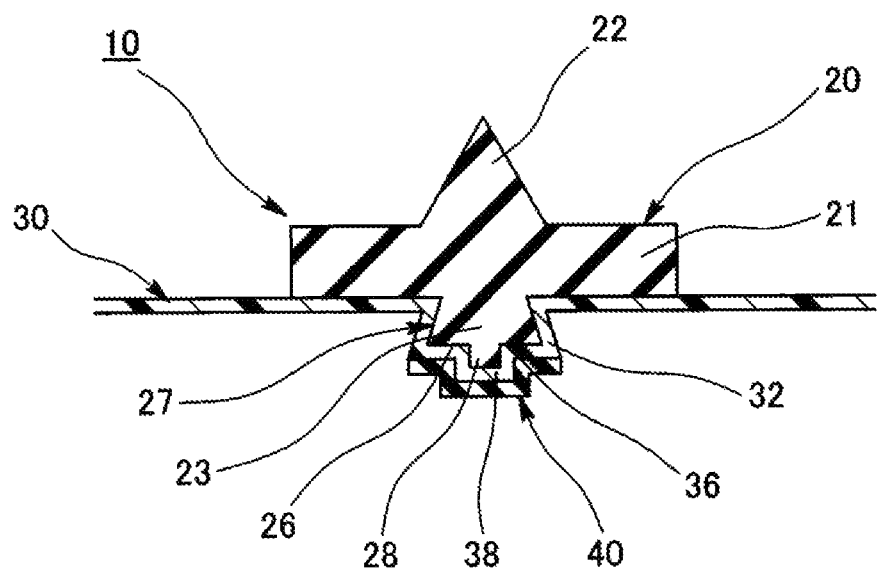

In FIG. 10 as an example thereof, a small projection 28 having a narrower width than the projection 23 is provided in the distal end portion of the projection 23 in the protruding direction. In a manner following this configuration, a small projection covering portion 38 covering the small projection 28 is provided in the distal end portion of the deformed portion 32 in the protruding direction. In addition, the flat portion 26 parallel to the base member 30 is provided in the distal end portion of the projection 23 in the protruding direction, and the small projection 28 is provided in a central portion of the flat portion 26 in the width direction. In addition, the reversely tapered structure 27 in which the width of the distal end is larger than the width of the proximal part is provided in the projection 23. As illustrated in FIG. 10A, the opposite gasket body is divided into a part deposited on the small projection covering portion 38 and a part deposited on the deformed portion 32 on both right and left sides. However, as illustrated in FIG. 10B, these parts may be integrally formed. When the small projection 28 is provided in this manner, the seal surface pressure is locally increased, so that the sealing efficiency can be further improved.

Fifth Embodiment

The opposite gasket body 40 formed as a film-shaped rubber layer may include a part deposited on not only the deformed portion 32 but also the base member body having a flat plate shape, by setting the width of the opposite gasket body 40 to be larger than the width of the deformed portion 32.

Figure 11:
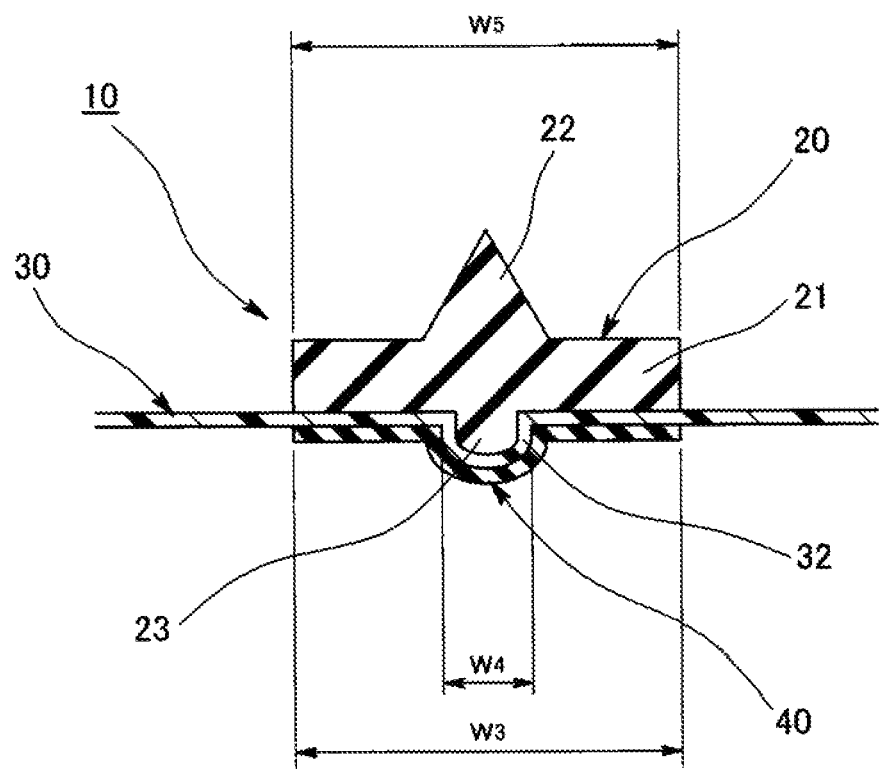
FIG. 11 is a cross-sectional view of a main part of a gasket according to a fifth embodiment.

In FIG. 11 as an example thereof, a width $w_3$ of the opposite gasket body 40 is larger than a width $w_4$ of the deformed portion 32 and is set to be equivalent to a width $w_5$ of the one gasket body 20. The opposite gasket body 40 is deposited on the base member 30 across the whole surface of the opposite gasket body 40.

Sixth Embodiment

The projection 23 may have a shape of a seal lip.

Figure 12:
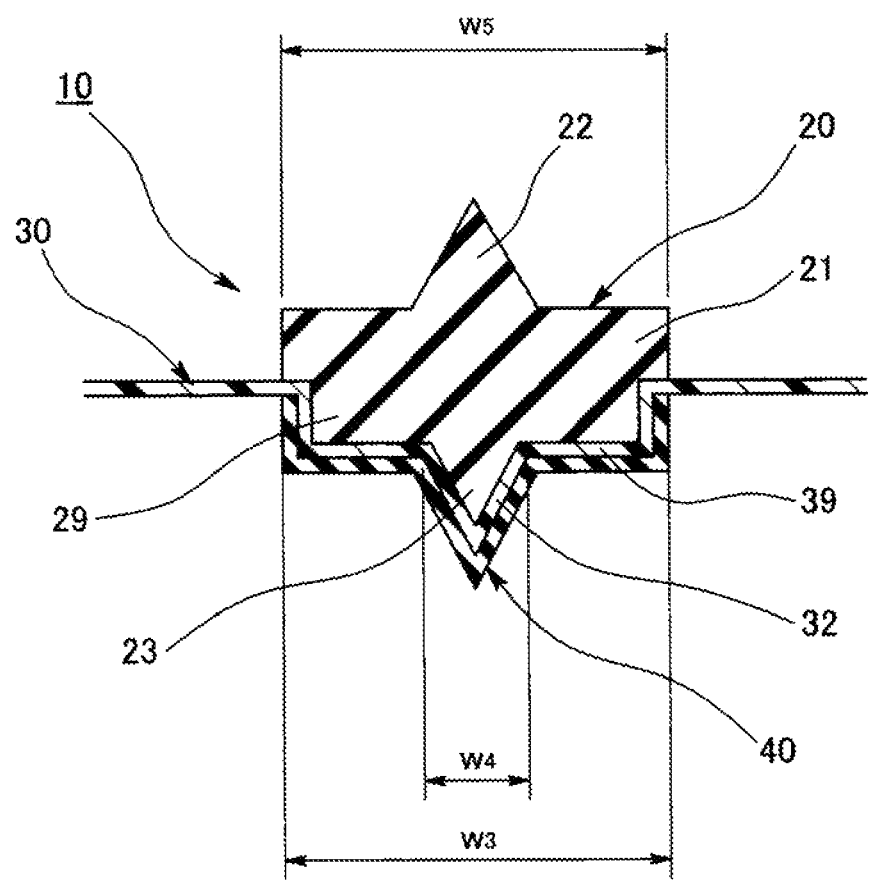
FIG. 12 is a cross-sectional view of a main part of a gasket according to a sixth embodiment.

In FIG. 12 as an example thereof, the projection 23 is formed as a seal lip having a triangular cross-sectional shape. In addition, the width $w_3$ of the opposite gasket body 40 is larger than the width $w_4$ of the deformed portion 32 and is set to be equivalent to the width $w_5$ of the one gasket body 20. The opposite gasket body 40 is deposited on the base member 30 across the whole surface of the opposite gasket body 40.

In addition, in the example of FIG. 12, since a projection base portion 29 having a rectangular cross-sectional shape is integrally provided between the projection 23 and the gasket base portion 21, due to a combination of the projection 23 having a shape of a seal lip and the projection base portion 29 having a rectangular cross-sectional shape, a gasket body on one surface side which is constituted of a combination of the seal lip 22 and the gasket base portion 21, and a gasket body on the other surface side to be symmetrical in the thickness direction with the gasket body on one surface side are provided. Therefore, in addition to the deformed portion 32 covering the projection 23, a base covering portion 39 covering the projection base portion 29 is provided in the base member 30. In addition to a part deposited on the deformed portion 32, a part deposited on the base covering portion 39 is provided in the opposite gasket body 40.

As in the fifth or sixth embodiment, when the width $w_3$ of the opposite gasket body 40 is set to be larger than the width $w_4$ of the deformed portion 32, the gasket 10 may be manufactured in a procedure in which the opposite gasket body 40 is pre-fitted to the base member 30 instead of being retrofitted. In this case, the gasket 10 is manufactured in the following procedure.

Figure 13A:
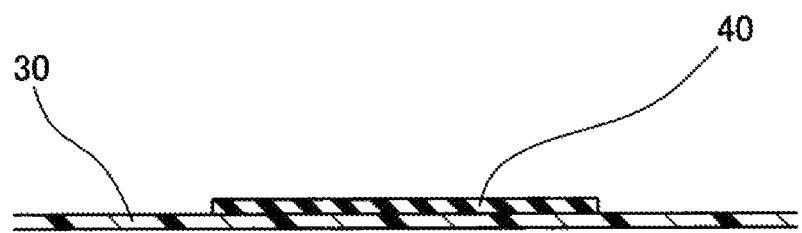
FIGS. 13A and 13B are views describing a method for manufacturing the gasket according to the fifth embodiment.

That is, as illustrated in FIG. 13A, first, the opposite gasket body 40 is formed in a pre-fitted manner on a flat surface of the base member 30 having a flat plate shape. The opposite gasket body 40 is formed by a simple method other than injection molding using a mold, such as a screen printing method, a dispenser coating method, a spray coating method, or an ink jet coating method.

Figure 13B:
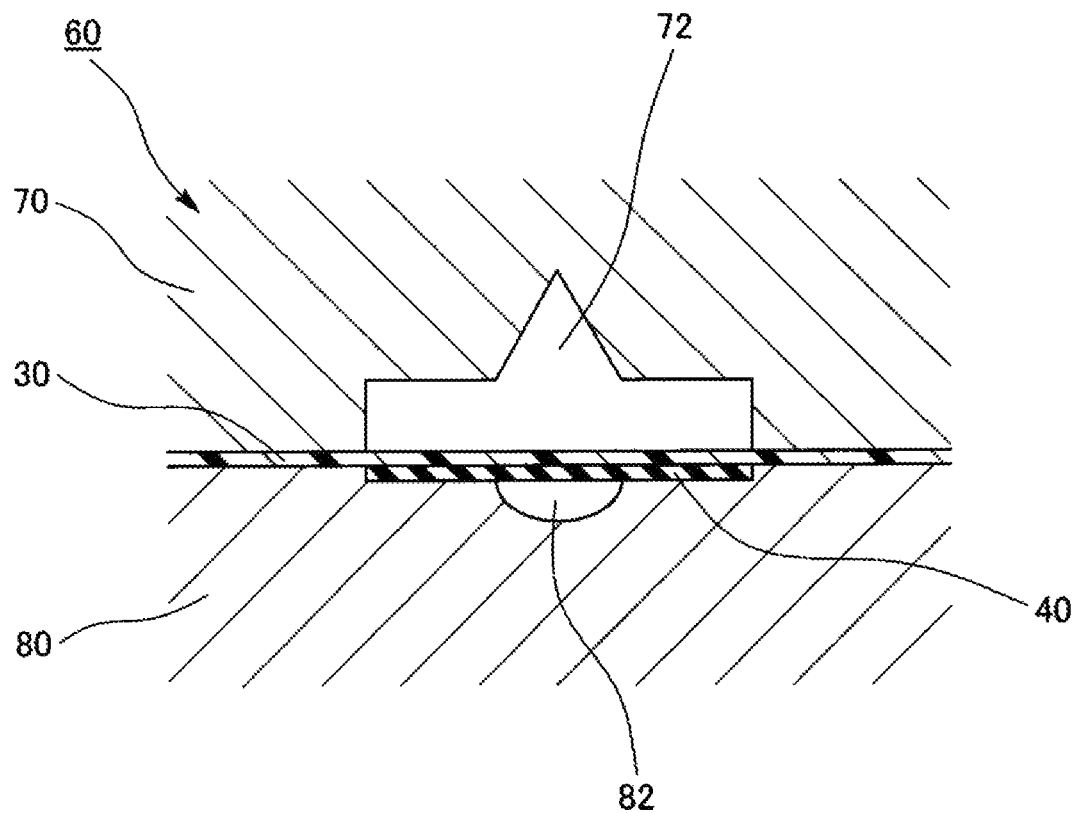
Figure 14:
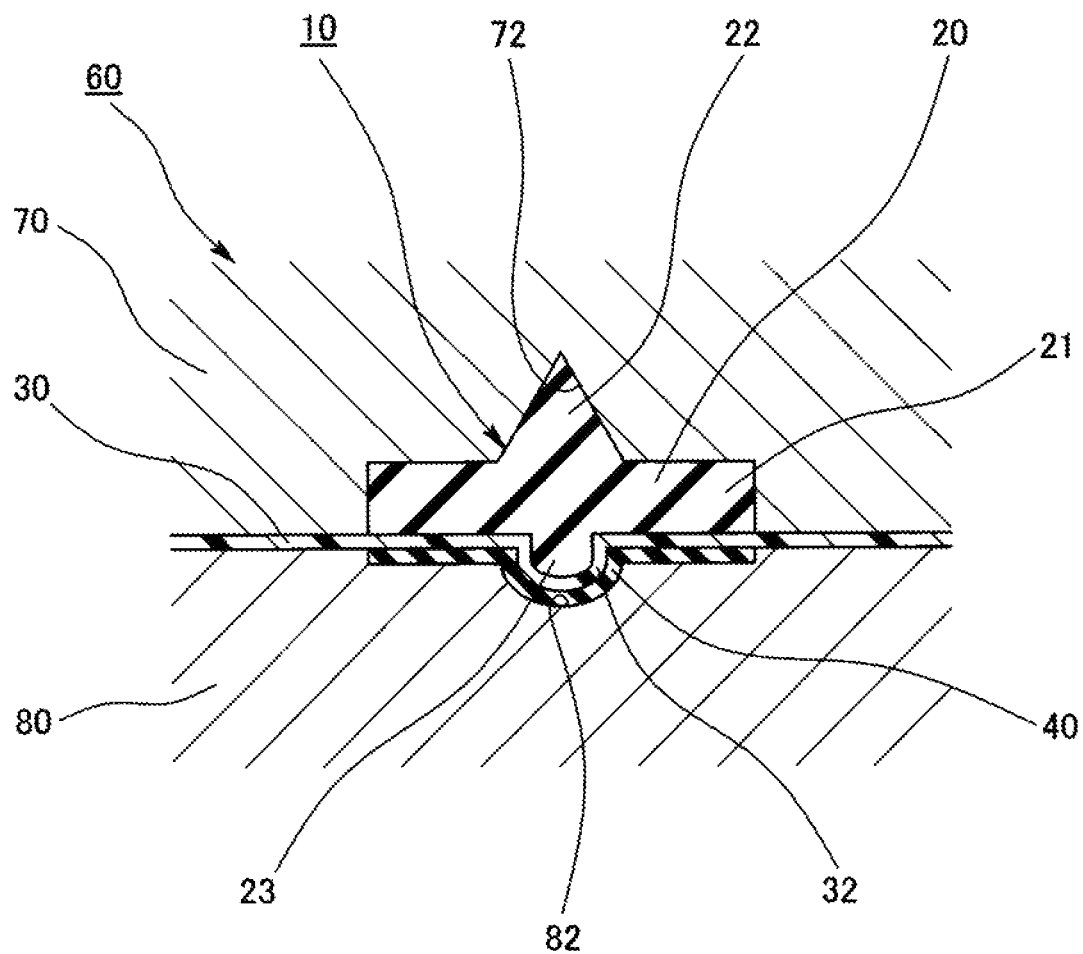
FIG. 14 is a view describing the method for manufacturing the gasket.
Figure 15:
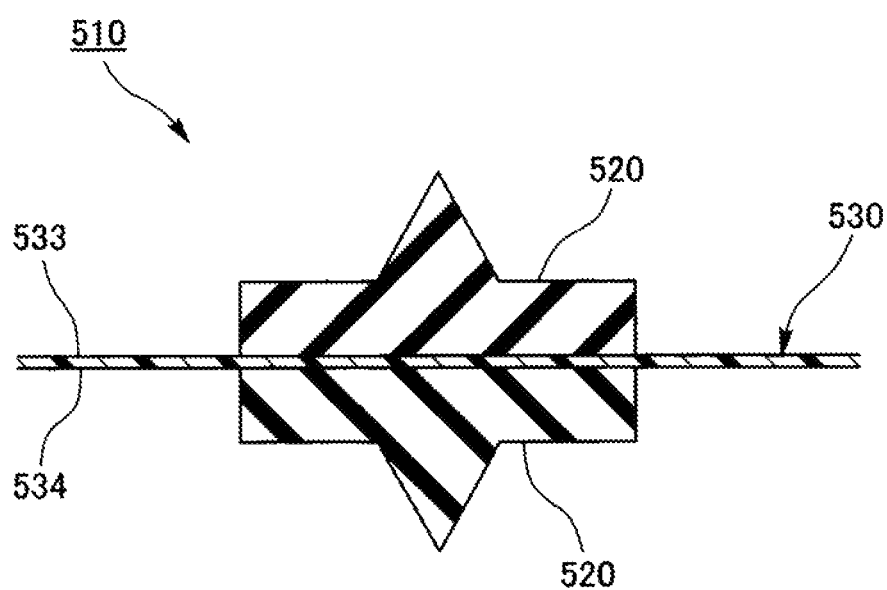
FIG. 15 is a cross-sectional view of a main part of a gasket according to an example in the related art.

Subsequently, as illustrated in FIG. 13B, the molds are fastened in a state where the base member 30 having the pre-fitted opposite gasket body 40 is interposed between the upper mold 70 and the lower mold 80. Subsequently, as illustrated in FIG. 14, the cavity 72 of the upper mold 70 is filled with a molding material for molding the one gasket body 20. When the cavity 72 of the upper mold 70 is filled with the molding material, the base member 30 and the opposite gasket body 40 are deformed due to a molding material filling pressure (injection pressure) thereof, so that they are shaped along the inner surface of the cavity 82 of the lower mold 80. Accordingly, the deformed portion 32 is formed in the base member 30, and the cavity 82 of the lower mold 80 is also filled with a molding material, thereby forming the projection 23.

Subsequently, after the molding material is cured, a molded article is taken out from the mold 60, and manufacturing of the gasket 10 illustrated in FIG. 11 is brought to completion. According to this procedure, it is easy to uniformly form the thickness of the opposite gasket body 40 (thickness of the film-shaped rubber layer) across the whole surface. Therefore, it is possible to effectively prevent the deformed portion 32 from being exposed as illustrated in FIG. 7.

In addition, regardless of the case of pre-fitting and the case of retrofitting described above, the curing time for the opposite gasket body 40 is shortened by using an ultraviolet curable material or a room-temperature curable material as a molding material for molding the opposite gasket body 40. Therefore, manufacturing of the gasket 10 can be further facilitated and simplified.

Furthermore, it is possible to conceive the following embodiments.

(A) There is provided a gasket to be mounted between sealing target members (separators) facing each other.

The gasket includes a gasket body (one gasket body) that is constituted of an elastic rubbery substance and comes into tight contact with one sealing target member, and a base member that has a flat plate shape and is deposited on the gasket body.

The gasket body includes a projection protruding toward an opposite sealing target member.

The base member includes a deformed portion having a recessed shape covering the projection.

A rubber layer (opposite gasket body) to come into contact with the opposite sealing target member is provided in the deformed portion.

(B)

In the gasket according to (A), distal ends of the projection and the deformed portion on the opposite sealing target member side have a flat surface shape.

(C)

There is provided a method for manufacturing the gasket according to (A) or (B) by using a mold.

The mold includes an upper mold which has a space for molding the gasket body with a molding material, and a lower mold which fixes the base member and has a groove portion for forming a deformed portion having a recessed shape in a part of the base member using an injection pressure generated when a molding material for molding the gasket body is injected.

The gasket is manufactured as follows. A molding material for molding the gasket is injected from the upper mold. A deformed portion is formed by causing a part of the base member to be deformed into a recessed shape due to an injection pressure of the molding material, and a projection is formed in a part of the gasket body. After the molded gasket body and the base member are separated from the mold, a rubber layer is provided in the deformed portion.

The invention claimed is:

1. A gasket comprising:
   a base member;
   one gasket body that is provided on one side surface of the base member in a thickness direction; and
   an opposite gasket body that is provided on an opposite side surface of the base member the thickness direction,
   wherein the one gasket body includes a projection protruding toward the opposite side surface in the thickness direction,
   wherein the base member includes a deformed portion protruding toward the opposite side surface in the thickness direction by covering the projection, the one gasket body overlapping the deformed portion and extending laterally outward and beyond the deformed portion, and
   wherein the opposite gasket body is formed as a film-shaped rubber layer deposited on a front surface of the deformed portion.

2. The gasket according to claim 1,
   wherein the projection includes a flat portion at a distal end of the projection.

3. The gasket according to claim 1,
   wherein the projection has a reversely tapered structure in which a width of a distal end is larger than a width of a proximal part of the projection.

4. The gasket according to claim 1,
   wherein the projection includes a small projection at a distal end of the projection.

* * * * *